United States Patent
Crossland et al.

(10) Patent No.: US 8,032,681 B2
(45) Date of Patent: Oct. 4, 2011

(54) PROCESSOR SELECTION FOR AN INTERRUPT BASED ON WILLINGNESS TO ACCEPT THE INTERRUPT AND ON PRIORITY

(75) Inventors: James B. Crossland, Banks, OR (US); Shivnandan D. Kaushik, Portland, OR (US); Keshavan K. Tiruvallur, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 11/966,356

(22) Filed: Dec. 28, 2007

(65) Prior Publication Data

US 2009/0070510 A1 Mar. 12, 2009

Related U.S. Application Data

(63) Continuation-in-part of application No. 11/850,782, filed on Sep. 6, 2007, now Pat. No. 7,627,706, and a continuation-in-part of application No. 11/850,790, filed on Sep. 6, 2007, now Pat. No. 7,769,938.

(51) Int. Cl.
*G06F 13/26* (2006.01)
*G06F 13/24* (2006.01)
*G06F 13/32* (2006.01)
(52) U.S. Cl. .................. 710/267; 710/264; 710/265
(58) Field of Classification Search .................. 710/267, 710/264, 265
See application file for complete search history.

(56) References Cited

U.S. PATENT DOCUMENTS

| | | | |
|---|---|---|---|
| 5,283,904 A | 2/1994 | Carson et al. | |
| 5,613,128 A | 3/1997 | Nizar et al. | |
| 5,724,527 A | 3/1998 | Karnik et al. | |
| 6,178,445 B1 * | 1/2001 | Dawkins et al. | 709/209 |
| 6,205,508 B1 * | 3/2001 | Bailey et al. | 710/260 |
| 6,665,761 B1 | 12/2003 | Svenkeson et al. | |
| 6,687,818 B1 | 2/2004 | Svenkeson et al. | |
| 6,813,665 B2 * | 11/2004 | Rankin et al. | 710/260 |
| 6,976,099 B2 | 12/2005 | George et al. | |
| 6,983,339 B1 | 1/2006 | Rabe et al. | |
| 7,039,740 B2 | 5/2006 | Glasco et al. | |
| 7,051,137 B2 | 5/2006 | Poisner | |
| 7,089,341 B2 | 8/2006 | Kriegel | |
| 7,191,349 B2 | 3/2007 | Kaushik et al. | |
| 7,222,203 B2 | 5/2007 | Madukkarumukumana et al. | |
| 7,363,394 B2 | 4/2008 | Shen et al. | |

(Continued)

OTHER PUBLICATIONS

International Search Report for corresponding matter, mailed May 7, 2009.

(Continued)

*Primary Examiner* — Mark Rinehart
*Assistant Examiner* — Jeremy S Cerullo
(74) *Attorney, Agent, or Firm* — Trop, Pruner & Hu, P.C.

(57) ABSTRACT

In some embodiments, an apparatus includes processors, signal storage circuitry, and processor selection logic. The signal storage circuitry is to hold willingness indication signals each indicative of a willingness level of an associated one of the processors to receive an interrupt and to hold priority indication signals each indicative of a processor priority level of an associated one of the processors, wherein there are multiple possible willingness levels and multiple possible processor priority levels. The processor selection logic is to select one of the processors to receive an interrupt based at least on the willingness indication signals. Other embodiments are described.

19 Claims, 5 Drawing Sheets

U.S. PATENT DOCUMENTS

| | | | |
|---|---|---|---|
| 7,496,706 | B2 | 2/2009 | Nguyen et al. |
| 2001/0052043 | A1* | 12/2001 | Pawlowski et al. ............ 710/260 |
| 2002/0124196 | A1* | 9/2002 | Morrow et al. ................ 713/320 |
| 2004/0015628 | A1 | 1/2004 | Glasco et al. |
| 2004/0088460 | A1 | 5/2004 | Poisner |
| 2004/0128563 | A1* | 7/2004 | Kaushik et al. ................ 713/300 |
| 2005/0027914 | A1 | 2/2005 | Hammalund et al. |
| 2005/0125580 | A1 | 6/2005 | Madukkarumukumana et al. |
| 2005/0228918 | A1 | 10/2005 | Kriegel |
| 2006/0015668 | A1 | 1/2006 | Nguyen et al. |
| 2006/0294277 | A1 | 12/2006 | Tetrick |
| 2007/0067521 | A1 | 3/2007 | Shen et al. |
| 2007/0143514 | A1 | 6/2007 | Kaushik et al. |
| 2007/0157197 | A1 | 7/2007 | Neiger et al. |
| 2007/0239917 | A1 | 10/2007 | Orita et al. |
| 2008/0162762 | A1 | 7/2008 | Neiger |
| 2009/0070511 | A1 | 3/2009 | Kaushik et al. |
| 2009/0070551 | A1 | 3/2009 | Kaushik |

OTHER PUBLICATIONS

Amendment dated Jun. 25, 2009 for U.S. Appl. No. 11/850,790.
Office action dated Mar. 31, 2009 for U.S. Appl. No. 11/850,790.
Notice of allowance for U.S. Appl. No. 11/850,782.
Amendment dated Jun. 3, 2009 for U.S. Appl. No. 11/850,782.
Office action dated Mar. 18, 2009 for U.S. Appl. No. 11/850,782.
Intel® 64 Architecture x2APIC Specification; Intel Corporation, Document No. 318148-001, Revision 1, Sep. 2007; all pages.
United States Patent Application, U.S. Appl. No. 11/618,456, filed Dec. 29, 2006, to Neiger et al.
United States Patent Application, U.S. Appl. No. 11/850,782, filed Sep. 6, 2007, to Kaushik et al.
United States Patent Application, U.S. Appl. No. 11/850,790, filed Sep. 6, 2007, to Kaushik et al.
Intel 64 and IA-32 Architectures Software Developer's Manual, vol. 3A, Nov. 2007, 1997-2007, cover page, p. ii, pp. 8-1 to 8-8 and 8-34 to 8-43.
U.S. Patent and Trademark Office, Notice of Allowance and Fee(s) Due dated Nov. 3, 2009, in related U.S. Appl. No. 11/850,790.
Intel, "Intel 64 Architecture x2APIC Specification," Sep. 2007, pp. 1-39.
International Search Report, PCT/US2008/074638, published on May 7, 2009, pp. 1-4.
German Patent and Trademark Office, First Office Action dated Nov. 25, 2009, in German application No. 10 2008 035 120.2-53.
Korean Patent Office, Notice of Preliminary Rejection dated Mar. 22, 2010, in Korean patent application No. 10-2008-87954.

* cited by examiner

PROCESSOR SELECTION FOR AN INTERRUPT BASED ON WILLINGNESS TO ACCEPT THE INTERRUPT AND ON PRIORITY

RELATED APPLICATIONS

This application is a continuation-in-part of application Ser. No. 11/850,782, filed Sep. 6, 2007, now U.S. Pat. No. 7,627,706, and a continuation-in-part of application Ser. No. 11/850,790, filed Sep. 6, 2007, now U.S. Pat. No. 7,769,938.

BACKGROUND

1. Technical Field

Embodiments of the invention relate generally to interrupts for processors.

2. Background Art

An Advanced Programmable Interrupt Controller (APIC) is a programmable interrupt controller (PIC) that receives interrupt requests and provides interrupt outputs according to programmable procedures or priorities. Local APICs are used in processors (such as microprocessors). I/O APICs are used in chipset devices (such as an input/output (I/O) controller hub (ICH)) and peripheral devices. Examples of peripheral devices include device coupled to the ICH that are compatible with one of the Peripheral Component Interconnect (PCI) standards or one of the PCI Express (PCIe) standards such as the PCI Express® Base Specification Revision 2.0, Dec. 20, 2006, provided by the PCI-SIG®. An xAPIC is an extended APIC, which is similar to early APICs but with some additional features and in the xAPIC architecture, local and I/O APICs communicate through a system bus rather than through an APIC bus. A further Extended xAPIC includes additional extensions and features.

Processor packages may include more than one core, each of which may include more than one processor. Physical mode interrupts are interrupts for which an interrupting device designates a processor by a physical identification number or is broadcast to all processors. Logical mode interrupts are interrupts for which an interrupting device designates a processor or processors by a logical identification numbers or numbers. APIC interrupt deliveries include directed interrupts (single processor target), multi-cast (multiple processor target) and broadcast (all processors). In a lowest priority or re-directable interrupt, a procedure is used to select a processor that is in the lowest processor priority to respond to the interrupt. This feature allows for an interrupt source (specifically a device) to specify multiple processors as potential targets for an interrupt and at the time of interrupt delivery have the platform hardware choose the "lowest priority" processor from the set of identified processors for delivery. The lowest priority is based on an operating system (OS) programmable processor priority that reflects the criticality of the work being performed on the CPU. Lowest priority may be decided in the chipset—often in an ad hoc fashion or with stale data of processor priority. Because the priority information is often not reliable, some chipsets merely select a particular processor (such as through a round robin technique) and provide the interrupt to that processor in a broadcast manner in which the other processors also receive the interrupts but do not respond to them.

The logical mode provides significantly greater flexibility in directed interrupts and is the mode used by Microsoft Windows & some Linux shrink-wrap operating systems. The logical mode of the xAPIC architecture provides an operating system software with flexibility in initializing the logical APIC identification number (ID), which is the unique identifier for each processor in the system. (The processors also have physical APIC IDs.) Other processors as well as devices or IOxAPICs use this ID to send interrupts to this processor. Given the flexibility in initialization of the logical xAPIC ID, there is no relationship between the actual physical topology of the platform and how the IDs are assigned. Although operating system initialization allows operating systems greater flexibility in grouping processors, at a platform level this complicates the routing of directed logical mode interrupts. Routing of logical mode interrupts is done through broadcasting the interrupts and having the local processor logic accept the interrupt if it matches its local APIC ID.

Many processors include a task priority register (TPR) that holds a task priority selected by software that allows the software to set a priority threshold for interrupting the processor. The processor will service only those interrupts that have a priority higher than that specified in the TPR. For example, if software sets the task priority in the TPR to 0, the processor will handle all interrupts; if it is set to 15, all interrupts are inhibited from being handled by that processor (with some exceptions). In some processors, including some processors manufactured by Intel Corporation, the TPR has 32 bits, with address FEE00080H, where H=hexadecimal. Bits 0 to 3 designate a task priority sub-class, bits 4 to 7 designate a task priority, and bits 8 to 31 are reserved. However, currently only bits 0-3 of the TPR are used to specify a priority of between 0 and 15, with bits 4-7 being unused. In some processors, a TPR is located in a local APIC in the processor. A processor priority registers (PPR) may hold a processor priority used to determine whether a pending interrupt can be dispensed to the processor.

Many computer systems have multiple interrupt vectors (such as 256 interrupt vectors with 16 groups of 16 interrupt vectors) pointed to by an interrupt descriptor table. A deferred procedure call (DPC) is a mechanism that allows a processor which is current executing a task to perform less critical tasks by deferring their execution. Many processors have power states referred to as C states, such as C0, C1, etc., where C0 is a lower power state than a high numbered C state such as C2. In some computer systems, different priorities have different meanings. For example, a priority 0 may called passive, priority 3 may called referred to as asynchronous procedure call (APC) priority, priority 4 may be referred to as a DPC priority, priorities 5-B are for devices, priority C is clocks, priority D is for inter-processor interrupts (IPIs), and priorities E and F are for other things. Other schemes are different meanings for priorities. For example, in some schemes, priority 3 is a DPC priority.

In some operating systems, the software priority scheme does not necessarily map well on to the xAPIC priority scheme. In these operating systems, there may be a priority inversion, where, for example, an idle processor can end up at a higher priority than processors doing work. Additionally, because of power management using different C-State, some idle processors (ones in deeper C-States) may be less suitable to service interrupts (take longer to respond and require more power) than others, but all of these processors are at the same priority level.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Some embodiments of the invention involve selecting a processor to receive an interrupt by considering willingness indication signals that are indicative of a willingness level of associated processors to receive an interrupt. The willingness indication signals may be merely power level indication signals to indicate a power state level of the associated processors (for example, c-states of the processors) or be set in response to the power state levels. Alternatively, the willingness levels may be set in response to factors in place of or in addition to power state levels.

In some embodiments, if one of the willingness indication signals has a willingness level that is more favorable for an interrupt than any of the others, then processor selection logic selects the processor associated with that one willingness indication signal to receive the interrupt. If there is a tie for the most favorable willingness level, then the processor selection logic also considers processor priority levels. If there is a tie of processor priority levels, then the processor selection logic performs a tie breaker algorithm.

The willingness indication signals and priority indication signals are held in signal storage circuitry that may be TPRs or some other circuitry. For a particular processor, the willingness indication signal and priority indication signal may be held adjacently or separated in different registers.

Figure 1:
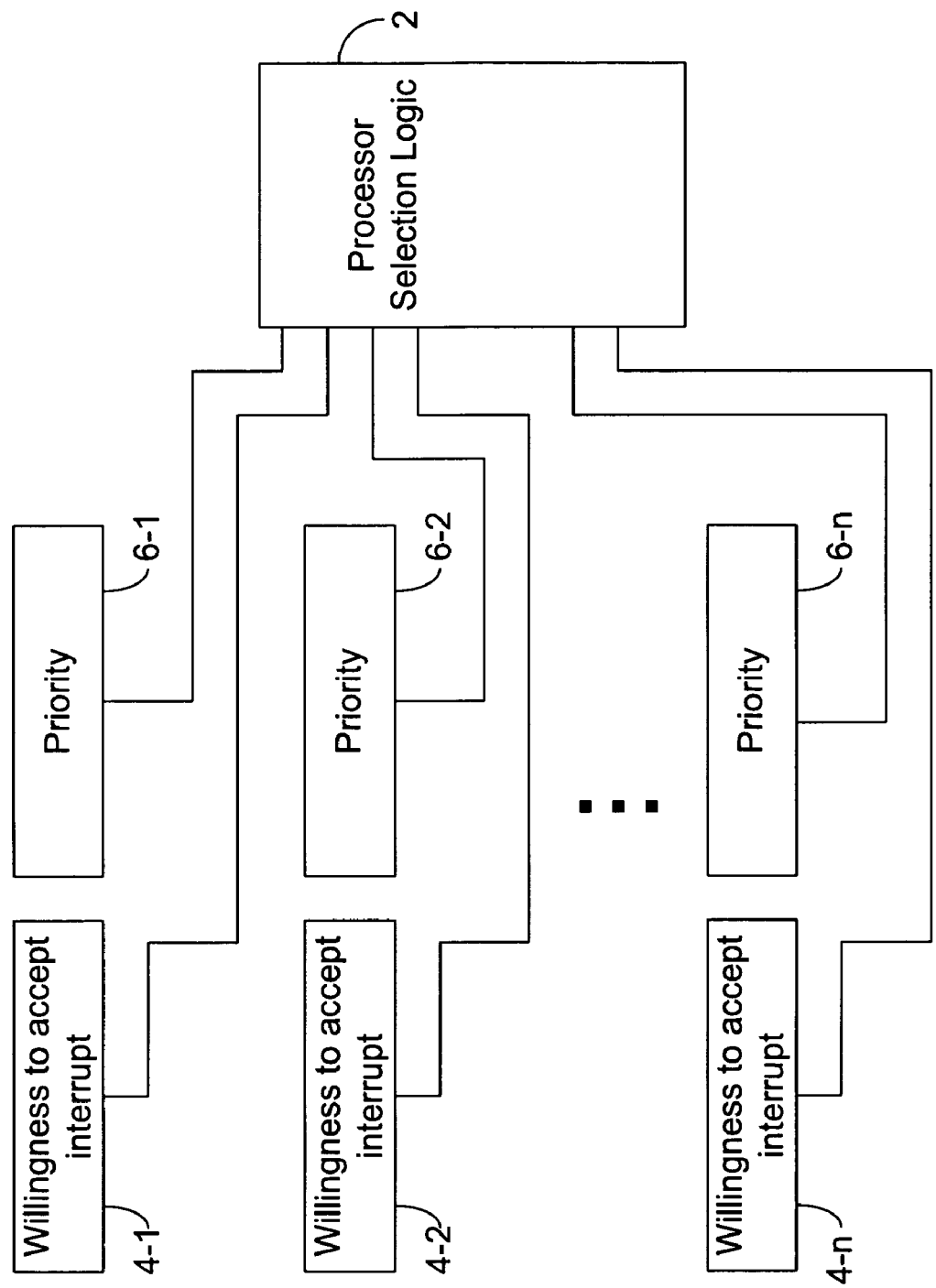
FIG. 1 is a block diagram representation of processor selection logic receiving signals representing a willingness for processors to receive an interrupt and signals representing processor priorities according to some embodiments.

FIG. 1 illustrates processor selection logic 2 to select a processor to receive an interrupt. Processor selection logic 2 receives a willingness indication signal 4-1 that is indicative of a willingness level of an associated processor (a first processor, which is not shown in FIG. 1) to accept an interrupt and a priority indication signal 6-1 that is indicative of a processor priority of the first processor. Processor selection logic 2 also receives a willingness indication signal 4-2 that is indicative of a willingness level of an associated processor (a second processor, which is not shown in FIG. 1) to accept an interrupt and a priority indication signal 6-1 that is indicative of a processor priority of the second processor. Processor selection logic 2 also receives a willingness indication signal 4-n that is indicative of a willingness level of an associated processor (an nth processor, which is not shown in FIG. 1) to accept an interrupt and a priority indication signal 6-1 that is indicative of a processor priority of the nth processor. There are various algorithms that processor selection logic 2 can use to select which processor(s) receives an interrupt. Examples of the algorithms are described herein.

Figure 2:
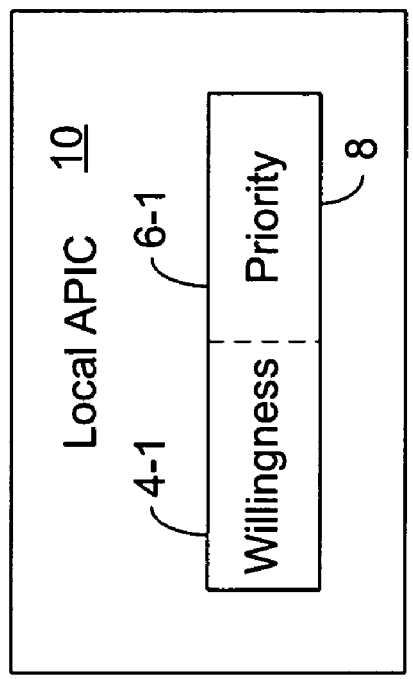
FIG. 2 is a block diagram representation of a local APIC including a register holding a signal representing a willingness for a processor to receive an interrupt and a signal representing the processor priority according to some embodiments.
Figure 3:
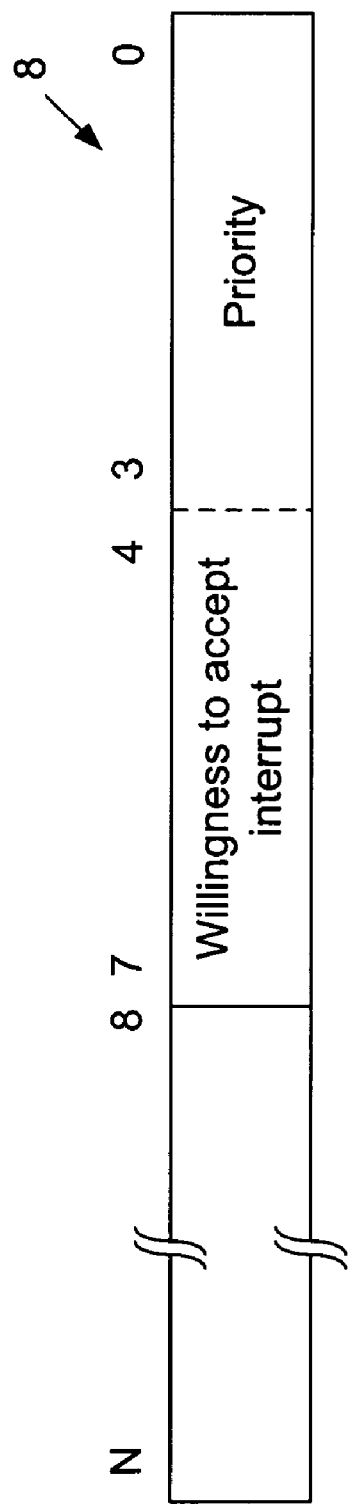
FIG. 3 is a more detailed example of the register of FIG. 2 according to some embodiments.

The willingness indication signals and priority indication signals may be held in various places. For example, FIG. 2 illustrates signals 4-1 and 6-1 being may be held in a register 8 of a local APIC 10. As an example, register 8 may be a TPR with, for example, offset 0x80 (where 0x means hexidecimal), or a CR8 register or some other register. As known in the prior art, some 64-bit processors include a control register (CR8) that processors read and write access to the TPR. It specifies that priority threshold value that operating systems use to control the priority class of external interrupts allowed to interrupt the processor. FIG. 3 shows a register 8 with the processor priority signals in bits 0 to 3 and the willingness indication signals in bits 4 to 7. Additional signals 8 to N may be reserved or used for other purposes. As an example, N may be 31 (and is not necessarily the same as "n" for the number of processors). Alternatively, signals 4-1 may be held in a different register than are signals 6-1. Signals 4-1 and 6-1 may be held in a location other than a local APIC.

As noted above, in some operating systems, the software priority scheme does not necessarily map well on to the xAPIC priority scheme. In these operating systems, there may be a priority inversion, where, for example, an idle processor can end up at a higher priority than processors doing work. Additionally, because of power management using different C-State, some idle processors (ones in deeper C-States) may be less suitable to service interrupts (take longer to respond and require more power) than others, but all of these processors are at the same priority level. It would be preferable if processors in lower numbered C-States were interrupted before processors in higher numbered C-States.

In some current computer systems, only 4 bits of a TPR value are used to specify a priority level of between 0 and 15. The other bits in the TPR are ignored. The willingness indication signal (such as a 4-bit value) could be included in the TPR to indicate a willingness of a processor to take an interrupt. A willingness level of 0 could indicate that processors are least willing to take the interrupt and a willingness level of 15 indicates that they are most willing to take the interrupt. In this scheme, with other things being the same, the higher the willingness level, the more favorable it is for the processor to receive the interrupt. Alternatively, a lower number could indicate a greater willingness. These levels may be in the opposite order of the current TPR values. This order may simplify migration of existing software to this scheme.

As an example, in some embodiments, lowest priority selection may be as follows:
    set of processors with the highest willingness to take interrupts
    If multiple processor have the same willingness, reduce to set with lowest priority
    If multiple processors have the same willingness and same priority, use existing tie breaker algorithm
For example:
    Assume DPC priority is 4
    Device interrupts and above would have a willingness to accept interrupts of 0 (backward compatible with existing code)
    DPC can be subdivided into multiple levels
        0x04 Actively running a DPC
        0xF4 Running C0 idle loop (polling for work)
        0xE4 C1 idle loop (HLT or MWAIT)
        0xC4 C2 idle loop
        0x64 C3 idle loop 0x24 C4 idle loop User level code is 0x80

As noted, 0x means the following values are in hexidecimal. A deferred procedure call (DPC) may be as discussed above, or be somewhat different. As known in the prior art, an idle loop occurs in a processor when the processor is waiting for instructions to perform. As known in the prior art, in some processors, a halt (HLT) instruction is run when an operating system enters an idle loop and the HLT instruction halts at least some activity of the processor until an external interrupt is received. As known in the prior art, in some processors, a memory wait (MWAIT) instruction operates with a monitor instruction (MONITOR) to allow a processor to signal an address on which to wait (monitor) and an instruction that causes that wait operation to commence (MWAIT).

Figure 4:
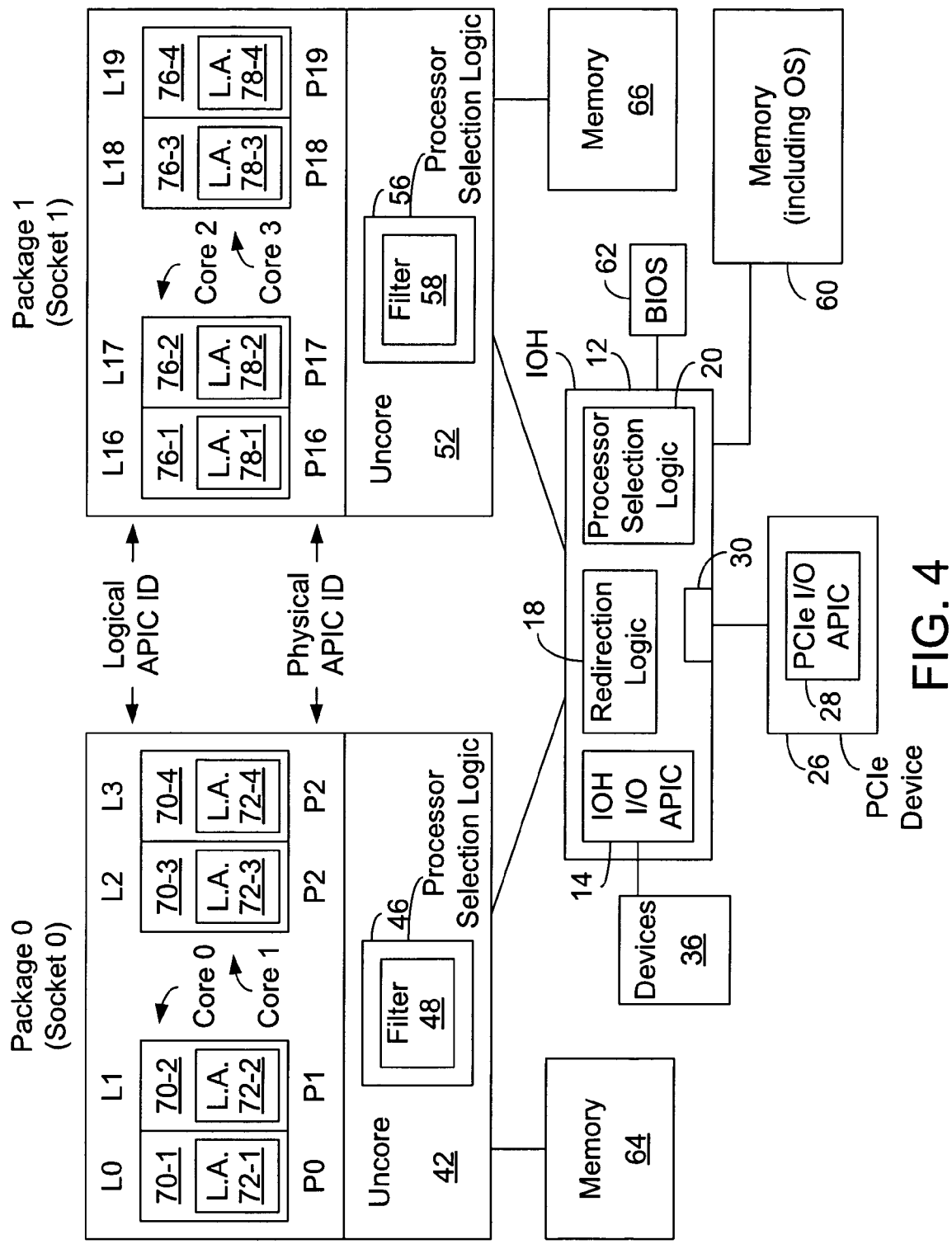
FIG. 4 is a block diagram representation of a system including multi-core processor packages, an input/output hub, and a device according to some embodiments of the inventions.

FIG. 4 illustrates a system that may be used in some embodiments of the inventions, but other embodiments may include systems that include different details. Referring to FIG. 4, a system includes multiple processor packages including at least a processor package 0 and a processor package 1 coupled to an input/output hub (IOH) 12. IOH 12 includes a IOH I/O APIC 14, redirection logic 18, and processor selection logic 20. A PCIe device 26 including a PCIe I/O APIC 28 is coupled to IOH 12 through interrupt interface circuitry 30. Devices 36 (such as a keyboard and a mouse) provide interrupts through IOH I/O APIC 14. IOH I/O APIC 14, I/O PCIe APIC 28, and local APICs 72-1 . . . 72-4 and 78-1 . . . 78-4 may be various types of APICs such as xAPICs or extended xAPICs. Alternatively, interrupt controllers other than APICs may be used.

Package 0 includes cores 0 and 1 and additional circuitry referred to herein as uncore 42. Core 0 includes processors 70-1 and 70-2, which include local APICs 72-1 and 72-2, respectively, and core 1 includes processors 70-3 and 70-4, which include local APICs 72-3 and 72-4, respectively. Package 1 includes cores 2 and 3 and additional circuitry referred to as uncore 52. Core 1 includes processors 76-1 and 76-2, which include local APICs 78-1 and 78-2, respectively, and core 3 includes processors 76-3 and 76-4, which include local APICs 78-3 and 78-4, respectively. Packages 0 and 1 will include various components not specifically illustrated. Memory 64 (such as main memory DRAM) is coupled to uncore 42, and memory 66 is coupled to uncore 52. Memory 60 (including a hard drive that holds an operating system (OS)) is coupled to IOH 12. There may be intermediate components between memory 60 and IOH 12. BIOS memory 62 is coupled to IOH 12.

Local APICS 72-1, 72-2, 72-3, 72-4, 78-1, 78-2, 78-3, and 78-4 may hold the willingness indication signals and priority indication signals as shown in FIGS. 2 and 3, or slightly differently. That is, in some embodiments, the willingness indication signals and priority indication signals are held in TPRs in the local APICs. Processor selection logic 46 and processor selection logic 56 may be like processor selection logic 2 in FIG. 1.

Processors 70-1, 70-2, 70-3, and 70-4 have physical APIC IDs P0, P1, P2, and P3, respectively. Processors 70-1, 70-2, 70-3, and 70-4 have physical APIC IDs P0, P1, P2, and P3, respectively. The processors may also have logical APIC IDs L0, L1, L2, and L3 and L16, L17, L18, and L19 based on the physical IDs P0, P1, P2, and P3 and P16, P17, P18, and P19, respectively, but that is not required. (Of course, P0 . . . P4 and P16 . . . P19 and L0 . . . L3 and L16 . . . L19 represent ID bits and not the letter "P" or "L" and a number.) In some embodiments, packages 0 and 1 include more than two cores (see, for example, FIG. 8) and a core may include more than two processors. In the illustrated embodiment, there is a gap in physical IDs between P3 and P16 and in corresponding logical IDs between L3 and L16. A reason for this is that in these embodiments, a cluster includes IDs for sixteen processors, whether or not there are sixteen actual processors. A processor package may include one chip (die) or more than one chip. A processor package may include zero, one or more than one memory chips.

Redirection logic 18 may be included to receive a value (for example, a 16-bit value) from device 26 and provides an interrupt to package 0 or package 1. The decision of which processor to use to respond to an interrupt can be made in various places. For example, depending on the embodiment, the decision may be made in processor selection logic 20 in IOH 12, and/or in a processor selection logic in an uncore (such as processor selection logic 46 in uncore 42 or processor selection logic 56 in uncore 52. A filter 48 in sub-logic 46 and a filter 58 in sub-logic 56 may be used to filter out from consideration processors based on, for example, power states (c-states) and/or processor priority. A similar filter may be used in processor selection logic 20. In some embodiments, there is not a processor selection logic 20, but merely processor selection logic in the uncores.

Figure 5:
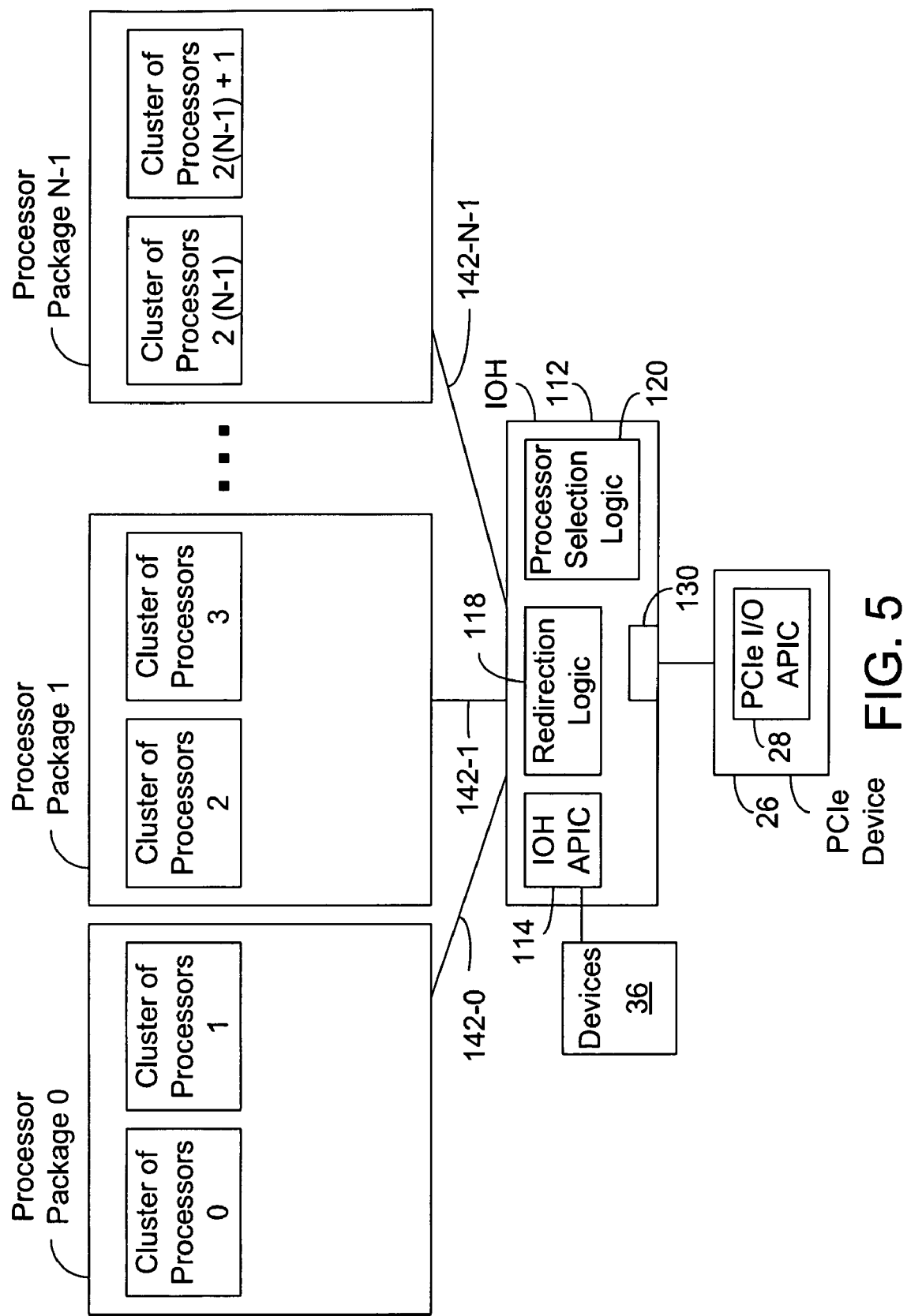
FIG. 5 is a block diagram representation of a system including multi-core processor packages, an input/output hub, and a device according to some embodiments of the inventions.

FIG. 5 is similar to FIG. 4 and illustrates an IOH 112 with a IOH APIC 114, redirection logic 118, processor selection logic 120, and interrupt interface circuitry 130 that may be similar to or identical to IOH APIC 14, redirection logic 18, processor selection logic 20, and interrupt interface circuitry 30 in FIG. 1. FIG. 5 also illustrates a processor package 0 including cluster of processors 0 and clusters of processors 1, a processor package 1 including cluster of processors 2 and clusters of processors 3, processor package N-1 including cluster of processors 2 (N-1) and clusters of processors 2 (N-1)+1. Processor packages 0, 1, . . . N-1 are coupled to IOH 112 through interconnects 142-0, 142-1 . . . 142-N-1. In some embodiments, there are separate interconnects to separate processors and in other embodiments there one set of interconnects is used for each processor package or one set of interrupts for each cluster. The cluster ID of an interrupt indicates which of the clusters is to receive the interrupt.

For example, assume that the cluster ID is 0000000000000010b (where b indicates binary). That would indicate cluster 2 is to receive the interrupt. This involves less power and involves less traffic on the interconnects as compared to an approach in which the interrupt is broadcast to all processors. The interrupt is not sent on interconnects 142-0 and 142-N-1 so there is less traffic on these interconnects which helps with bandwidth and reducing power. Also, processors in clusters 0, 1, 3, 2(N-1), and 2(N-1)+1 do not have to check whether the interrupt is directed to them, which reduces power (particularly where a processor must come out of a deep low power state to determine whether the interrupt is directed to it). There may also be less cache line traffic between processors in different clusters because of locality. Other embodiments may include even more clusters of processors in processor packages. Other components (such as uncores if included) are not shown in FIG. 4. There may be additional components such as bridges between the IOH and processor packages. Further, there may be more than one IOH in a system.

Figure 6:
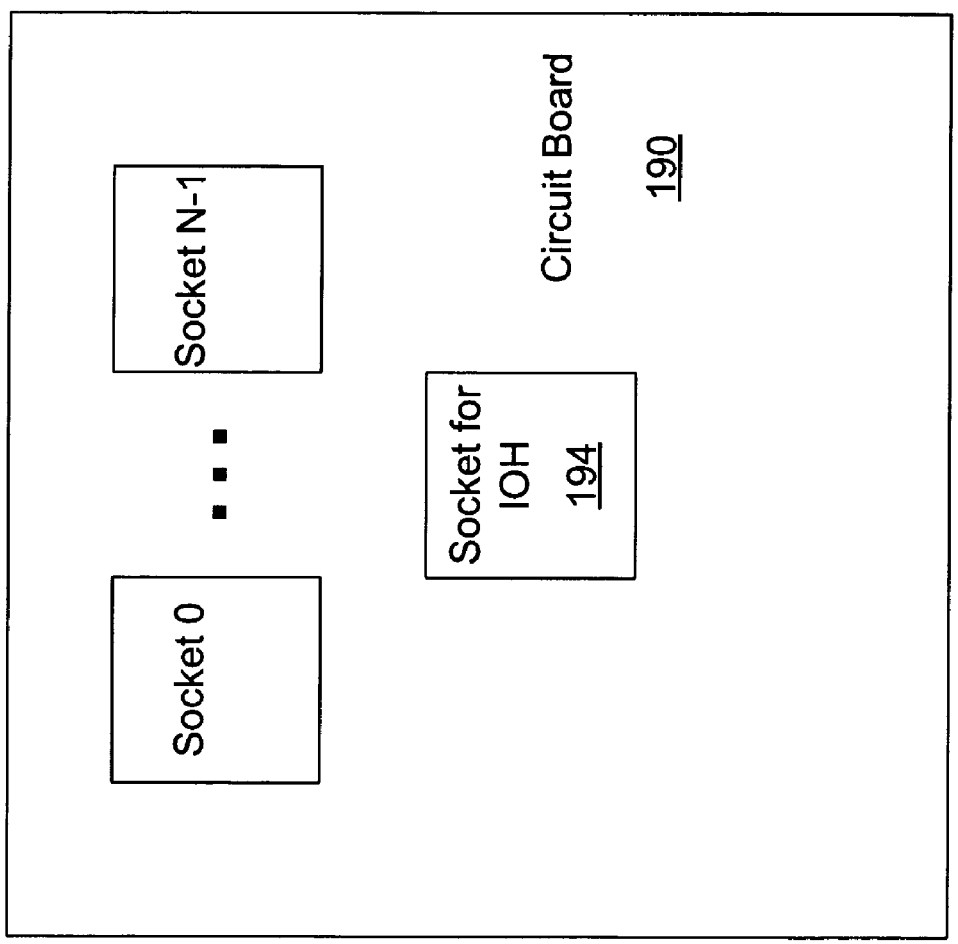
FIG. 6 is a block diagram representation of sockets on a circuit board for use in some embodiments of the inventions.

FIG. 6 illustrates a circuit board 190 (such as a printed circuit board) includes sockets including a socket 0 to receive a processor package 0, socket N-1 to receive a processor package N-1, and socket 194 to receive an IOH chip. In some implementations, circuit board 190 includes additional sockets for processor packages and for various other chips, but in other implementations, circuit board 190 includes only two sockets. As used herein, the term "socket" covers various techniques for coupling a chip or chips to a circuit board.

Additional Information and Embodiments

In some embodiments and in some situations, the processor selection logic may select more than one processor to receive an interrupt.

The "logic" referred to herein can be implemented in circuits, software, microcode, or a combination of them.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, that A is responsive to B, does not mean it is not also responsive to C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. An apparatus comprising:
   processors each having a local programmable interrupt controller (PIC) and having a physical PIC identifier and a logical PIC identifier based on the physical PIC identifier;
   signal storage circuitry in each of the local PICs to hold an indication signal indicative of a level of an associated one of the processors to accept an interrupt and to hold a priority indication signal indicative of a processor priority level of an associated one of the processors, wherein there are multiple possible levels and multiple possible processor priority levels, the indication signal set in response to at least one factor in place of a power state level of the associated processor and wherein an order of the levels is opposite to an order of the processor priority levels to prevent a priority inversion; and
   processor selection logic to select one of the processors to receive an interrupt based at least on the indication signals.

2. The apparatus of claim 1, wherein if one of the indication signals has a level that is more favorable for an interrupt than the level of any of the other indication signals, then the processor selection logic is to select the processor associated with that one indication signal to receive the interrupt.

3. The apparatus of claim 1, wherein if more than one of the indication signals tie for having a level that is more favorable for an interrupt than any other level of the other indication signals, then the processor selection logic is to consider the priority indication signals in selection of the processor to receive the interrupt.

4. The apparatus of claim 3, wherein if there is the tie of indication signals and if one of the priority indication signals has a priority level that is more favorable for an interrupt than the priority level of any of the other priority indication signals, then the processor selection logic is to select the processor associated with that one priority indication signal to receive the interrupt.

5. The apparatus of claim 3, wherein if there is the tie of indication signals and if more than one of the priority indication signals tie for having a priority level that is more favorable for an interrupt than any other priority level of the other priority indication signals, then the processor selection logic is to perform a tie breaker algorithm to select the processor from among those processors that are associated with tied level and tied priority level.

6. The apparatus of claim 1, wherein the processors, signal storage circuitry, and processor selection logic are each included in a package.

7. The apparatus of claim 1, further comprising a filter of the processor selection logic to filter out from consideration one or more of the processors based on at least one of a corresponding power state level and processor priority level.

8. An apparatus comprising:
   signal storage circuitry to hold indication signals each indicative of a level of an associated one of a plurality of processors to accept an interrupt and to hold priority indication signals each indicative of a processor priority level of an associated one of the processors, the plurality of processors included in a plurality of processor packages each having a cluster of processors, wherein there are multiple possible levels, and multiple possible processor priority levels and the indication signals are set in response to at least one factor in place of a power level of the associated processor and having a first value to indicate a device interrupt, at least one second value to indicate a deferred procedure call, and a third value to indicate user level code; and
   processor selection logic to select one of the processors to receive an interrupt based on the indication signals and the priority indication signals, the processor selection logic including a filter to filter out from consideration one or more of the processors based on at least one of a corresponding power level and processor priority level and to send the interrupt only on an interconnect coupled between the processor selection logic and the processor package including the selected processor and not on one or more interconnects coupled between the processor selection logic and other processor packages.

9. The apparatus of claim 8, wherein if one of the indication signals has a level that is more favorable for an interrupt than the level of any of the other indication signals, then the processor selection logic is to select the processor associated with that one indication signal to receive the interrupt.

10. The apparatus of claim 8, wherein if more than one of the indication signals tie for having a level that is more favorable for an interrupt than any other level of the other indication signals, then the processor selection logic is to consider the priority indication signals in selection of the processor to receive the interrupt.

11. The apparatus of claim 10, wherein if there is the tie of indication signals and if the one of the priority indication signals has a priority level that is more favorable for an interrupt than the priority level of any of the other priority indication signals, then the processor selection logic is to select the processor associated with that one priority indication signal to receive the interrupt.

12. The apparatus of claim 10, wherein if there is the tie of indication signals and if more than one of the priority indication signals tie for having a priority level that is more favorable for an interrupt than any other priority level of the other priority indication signals, then the processor selection logic is to perform a tie breaker algorithm to select the processor from among those processors that are associated with tied willingness level and tied priority level.

13. The apparatus of claim 8, wherein an order of the levels is opposite to an order of the processor priority levels.

14. The apparatus of claim 8, wherein the at least one second value comprises a plurality of second values, wherein a first of the plurality of second values is to identify execution of the deferred procedure call.

15. The apparatus of claim 14, wherein a second of the plurality of second values is to identify execution of a work poll operation.

16. The apparatus of claim 14, wherein additional ones of the plurality of second values are to each identify an idle loop for a corresponding one of a plurality of power states.

17. A method comprising:
  comparing indication signals each indicative of a level of an associated processor to accept an interrupt, the indication signals set in response to at least one factor in place of a power state level of the associated processor and having a first value to indicate a device interrupt, at least one second value to indicate a deferred procedure call, and a third value to indicate user level code, and separate from priority indication signals each indicative of a processor priority level, wherein an order of the levels is opposite to an order of the processor priority levels to prevent priority inversion;
  if one of the indication signals has a level that is more favorable for an interrupt than the level of any of the other indication signals, then selecting the processor associated with that one indication signal to receive the interrupt; and
  if more than one of the indication signals tie for having a level that is more favorable for an interrupt than any other level of the other indication signals, then considering the priority indication signals each indicative of a processor priority level of an associated processor in selecting the processor to receive the interrupt.

18. The method of claim 17, wherein if there is the tie of the indication signals and if one of the priority indication signals has a priority level that is more favorable for an interrupt than the priority level of any of the other priority indication signals, then the method includes selecting the processor associated with that one priority indication signal to receive the interrupt.

19. The method of claim 17, wherein if there is the tie of the indication signals and if more than one of the priority indication signals tie for having a priority level that is more favorable for an interrupt than any other priority level of the other priority indication signals, then the method includes performing a tie breaker algorithm to select the processor from among those processors that are associated with tied level and tied priority level.

* * * * *